United States Patent [19]
McConnell et al.

[11] 3,765,770
[45] Oct. 16, 1973

[54] AERIAL SURVEY

[75] Inventors: Frederick C. McConnell; George Jason; Neil J. Armstrong, all of Calgary, Alberta, Canada

[73] Assignee: Spartan Air Services Limited, Ottawa, Ontario, Canada

[22] Filed: Aug. 25, 1972

[21] Appl. No.: 283,791

Related U.S. Application Data

[60] Division of Ser. No. 65,259, Aug. 19, 1970, Pat. No. 3,709,607, which is a continuation of Ser. No. 817,448, April 18, 1969, abandoned.

[52] U.S. Cl. ............... 356/152, 356/4, 178/6.8, 250/203 R, 244/17.11, 340/25
[51] Int. Cl. ........................................... G01b 11/26
[58] Field of Search .............. 356/4, 5, 141, 152, 356/172, 138; 250/203 R, 215; 244/17.11, 17.17; 33/1 T; 178/6.8; 340/25

[56] References Cited
UNITED STATES PATENTS

| | | | |
|---|---|---|---|
| 3,603,688 | 9/1971 | Smith-Vaniz | 356/152 |
| 3,523,660 | 8/1970 | Atteberry et al. | 244/17.11 |
| 3,370,293 | 2/1968 | Green | 250/203 R |
| 3,439,170 | 4/1969 | Zagone et al. | 356/152 |
| 3,426,146 | 2/1969 | Seaman | 356/152 |
| 2,817,994 | 12/1957 | Ehrenhaft et al. | 356/150 |

FOREIGN PATENTS OR APPLICATIONS

| | | | |
|---|---|---|---|
| 854,688 | 11/1952 | Germany | 33/1 T |

OTHER PUBLICATIONS

Geodolite 3A, Spectra–Physics, Inc., Brochure, 3-1968

*Primary Examiner*—Samuel Feinberg
*Assistant Examiner*—S. C. Buczinski
*Attorney*—Harvey Kaye

[57] ABSTRACT

A control and actuating apparatus for use in aerial surveying using a helicopter has first and second concentric arrays of laser beam sensitive cells in a laser beam detector for initiating operation of distance measuring equipment and of an altitude measuring device when the innermost array senses a laser beam and discontinuing the operation when the outermost array senses the laser beam.

8 Claims, 3 Drawing Figures

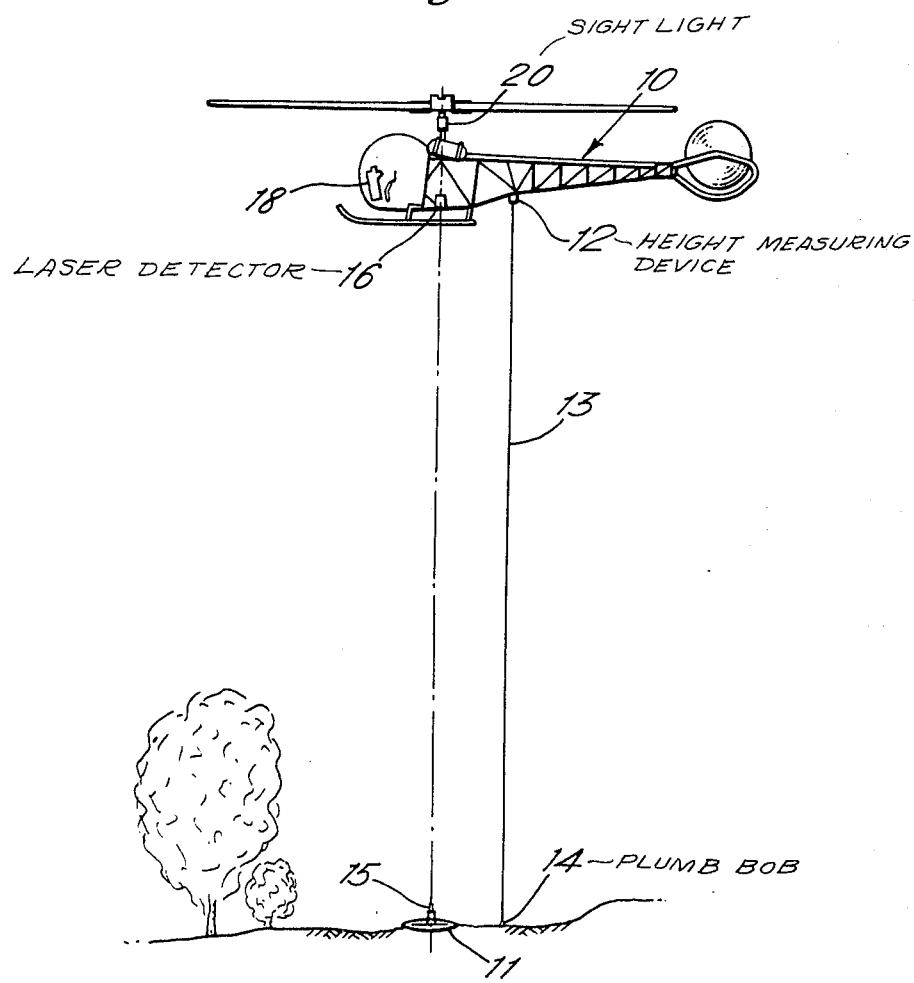

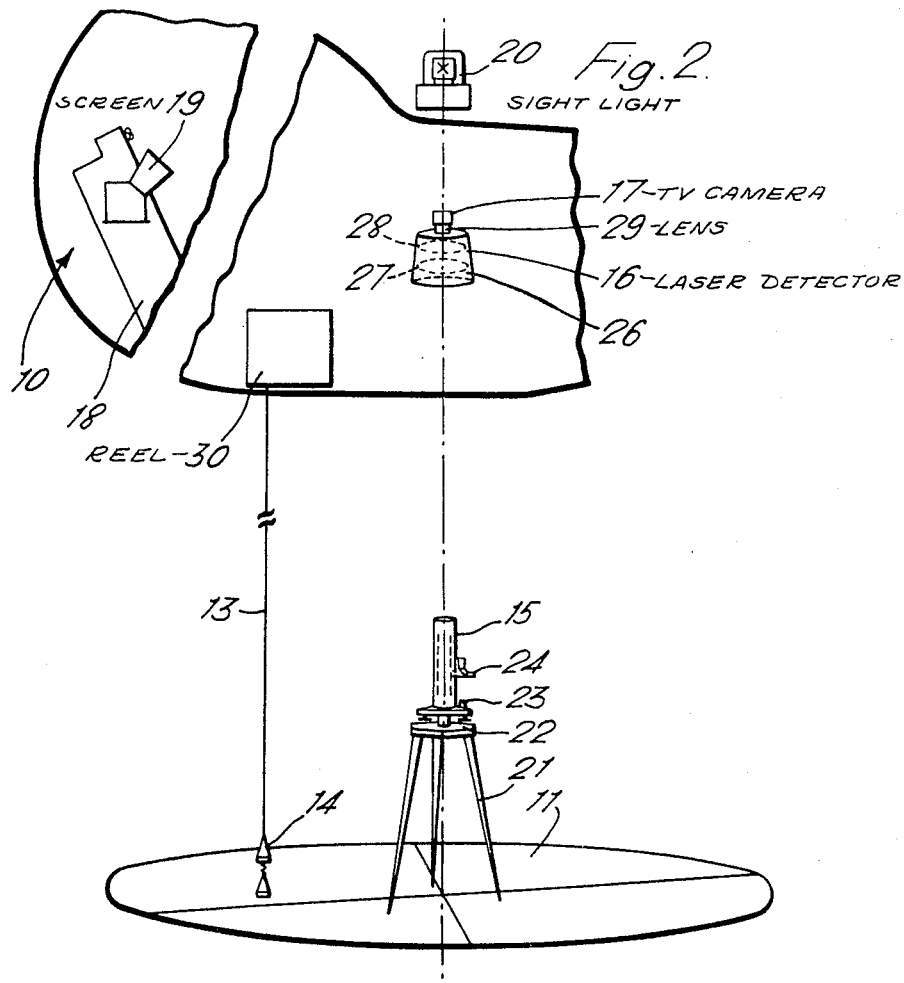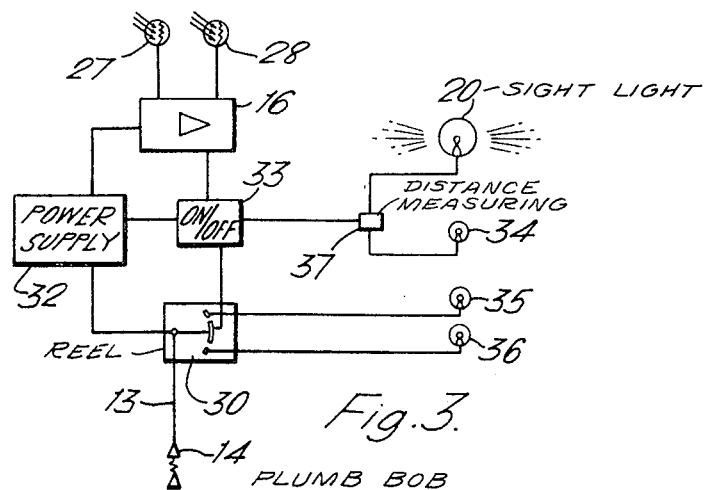

AERIAL SURVEY

CROSS REFERENCE TO RELATED APPLICATION

This application is a division of application Ser. No. 65,259, filed Aug. 19th, 1970 now U.S. Pat. No. 3,709,607, which itself is a continuation of Ser. No. 817,448, filed Apr. 18th, 1969, and now abandoned.

This invention relates to a control and actuating apparatus for use in aerial surveying.

Surveying has for many years been one of the most important aspects of mining, petroleum or other field operation, and it is a time-consuming procedure. All surveys rest primarily on linear measurements for the direct determination of distances. In non-wooded, accessible areas, surveying has historically been carried out by surveyors using transits and stadia poles. Often the syste of surveying known as triangulation (which utilizes the simple geometrical principle that if one side and two angles of a triangle are known, the measurements of the rest of the triangle can be computed) is used. Thus, linear measurements may be supplemented by angular measurements. This enables distances to be determined over areas which cannot be measured directly, as, for example, hilly or broken ground.

In wooded areas and in relatively inaccessible areas, both distance and angle measuring devices (transits and theodolites) placed at ground level cannot be used. Accordingly, it has been the practice to build a tower on top of which sits a slave or master station, thus giving a line of sight above the treetops for 20 to 30 miles distance. A portable steel observation tower, as for example that known under the trade name Bilby Tower, has frequently been used. Such an observation tower is like a giant tripod, extensible to over 100 feet, and is provided with an inner tripod which holds the transit or theodolite, but does not vibrate at the movements of the surveyors who stand on the separate outer tower. The task of building or erecting such towers in remote areas has been facilitated in recent years by the use of helicopters, which can transport both the men and the materials.

However, the building or erecting of such towers is an expensive and time-consuming task. Consequently it has been suggested that the helicopter could be used as a sighting target, if it could hover accurately over a point on the terrain. The practical success of such a proposal depends upon: firstly, the provision of accurate means of measuring the distance from a fixed point (in line of sight with and distant from the helicopter) to the helicopter; secondly, the provision of sufficient hovering accuracy for the helicopter; and thirdly, the provision of a satisfactory hover sight.

The first problem has been solved by use of a tellurometer, which is a distance measuring device utilizing line-of-sight radio waves. It is, in effect, a two-way radio telephone system which operates between a master unit and a remote unit. The second problem has been solved by provision, in the helicopter, of a stability augmentation system which allows for a more accurate hovering technique.

It has been suggested to solve the third problem and also to provide an accurate surveying system and technique that the following procedure be utilized. A helicopter is fitted with a vertical rod (like a stadia pole) located at the centre of the top of the helicopter. Also installed in the helicopter and precisely located in the centre bottom of the machine is a plumb bob on a string, attached to a drum mechanism, for measuring the distance of the helicopter above the ground. By looking through a series of mirrors located in the pilot's compartment of the helicopter, the pilot can see the string and plumb bob and a station mark below him. The pilot can raise or lower the helicopter to accommodate the height of the trees. He can also manoeuvre until the extended plumb bob is located exactly over the station mark. He can then attempt to hold the helicopter in this fixed position while another member of the survey crew, using a tellurometer, takes a reading on the vertical pole attached to the top of the helicopter. The helicopter may also have attached to the top thereof a Grimes beacon or a strobe light, in order that the general direction could be determined by the tellurometer operator in the distance. The height of the helicopter is measured by calibrating the plumb bob string. The pilot and the tellurometer operator are in radio contact so that the pilot can inform the operator when the plumb bob is precisely over the station mark in a position for a reading to be taken.

While this system and procedure has proven fairly accurate, it is quite expensive. Furthermore, the accuracy is impaired by the fact that wind and turbulence created by the helicopter may have an effect on the stability of the plumb bob line. Consequently, the stadia pole atop the helicopter may not be along a line exactly vertical to the station mark.

It is an object of this invention to provide a control and actuating mechanism which can aid in the operation of surveying equipment, and contribute to an accurate and feasible system for aerial surveying.

According to the present invention, control and actuating apparatus on a helicopter includes a laser beam receiver with first means for sensing a predetermined desired condition and in response to the presence of the condition for initiating operation of a preselected mechanism, and second means for sensing a predetermined undesired condition and in response thereto discontinuing operation of a preselected mechanism. In a preferred embodiment, the control and actuating mechanism utilizes a laser beam detector having plural detection cells. A first cell upon sensing the presence of a desired condition initiates operation of a preselected mechanism. A second cell upon sensing the presence of a predetermined undesirable condition positively discontinues operation of a preselected mechanism.

As an example, the desired condition can be met when the hovering helicopter is accurately positioned vertically above a point on the terrain, and the undesired condition may be achieved when the helicopter is no longer accurately positioned over that point. Consequently, when the first means in the laser beam receiver, i.e. a first detection cell, senses the laser beam and that therefore the helicopter is accurately positioned over the survey point, distance measuring devices and a Grimes beacon or strobe light can be activated and their operation commenced. When the second means in the laser beam receiver, i.e. the second detection cell, senses that the helicopter has drifted, i.e. is no longer accurately positioned over the station mark, the operation of the distance measuring devices and the Grimes beacon or strobe light can be terminated.

Another example of the actuation of a detector control mechanism would be the release of the plumb bob reel mechanism when the helicopter is accurately positioned over the survey point, so that the perpendicular distance of the helicopter over the survey point at that time can be measured.

The helicopter which is used in the system and procedure of aspects of this invention preferably is one which is equipped with a stability augmentation system, which aids in a more accurate hovering technique than may be otherwise possible. One such helicopter is known under the trade name Hiller model SL4, and is manufactured by the Hiller Helicopter Company. Another such helicopter is the Bell 47 model 3B-1 helicopter.

The laser can be attached to any normal instrument, and in the present invention, it is a portable laser preferably of the type known as a transit-laser. The inherent characteristics of a laser, namely the emission of an intense beam of coherent light (red in colour in a ruby laser) which is clearly visible either at night or in daylight, are used to advantage. Since the laser beam remains essentially parallel and does not expand as it travels over long distances, the laser beam is analogous to an endless, weightless, stretched string which is visible over a great distance. It becomes, in effect, a clearly visible reference line.

A transit-laser beam is clearly visible on a target one thousand feet away as a spot whose centre can be judged to within about one-half inch. Simple detectors (for example goggles) are available, which by filtering out extraneous light in effect permit greater viewing range. In addition, the operator may use a retroreflector which will pick up the beam at a substantial range allowing the operator to know whether or not he is constantly on target. Should his instrument be jarred for any reason, the retroreflector will make him aware that such has happened. At night, the transit-laser beam is visible for a distance of up to about ten miles. One commercially available laser which may be used in the practice of this invention is known as the University Laboratories Model 610 transit-laser.

The means associated with the helicopter for the taking of distance measurements may be simple or sophisticated. One such simple means is a sight light by which transit readings may be taken from two known locations. Alternatively an autotape or a position-fixing device such as the model MRB3 of Tellurometer Canada Limited may be used; these devices can be adapted to be activated electronically by a laser detector. Upon reception of the laser beam, the laser detector then activates the autotape or the MRB3 which automatically takes distance readings on remote units located at known locations.

The laser detector is preferably associated with a closed circuit television system for providing the helicopter pilot with a visual image of the terrain being scanned by the laser detector and of the laser beam. The closed-circuit television system which can be used in the various aspects of this invention preferably is one which has high resolution, even under the conditions of vibration or other problems associated with helicopter operation, in order to provide a clear picture. One such commercially available system is manufactured under the brand name of Sony closed circuit television set.

The camera of the closed circuit television system in one embodiment may be mounted pointing down and ahead through the tail boom of the helicopter. The viewing console of the television system normally is placed in front of the rudder pedals of the helicopter and is used by the pilot to enable him to face his instrument panel and still be able to see underneath his machine, thus facilitating his hovering over a fixed point. The closed circuit television system enables the helicopter to hover over a station mark and to obtain a "fix" over such station mark. In another embodiment, the television camera preferably is mounted on well-lubricated and ball-bearinged gimbal rings. Thus, regardless of the attitude of the helicopter, the camera is free to move so that it is perpendicular with the ground at all times when the helicopter is airborne.

It is an additional advantage in the practice of this invention that a tape recording of the television operations can be made and preserved. This tape recording could be reviewed later, after the field work is completed, should it be necessary to check the survey results.

The laser beam is used to provide an accurate positioning of the hovering helicopter over a station mark. The accurate measurement of the helicopter height would normally be carried out by using a plumb bob string attached to a calibrated drum. When the plumb bob touches the station mark, the exact height above the station mark can be read.

It is to be observed that reference has been made to a "station mark." Other well-known survey points, such as bench marks, triangulation station marks, traverse station marks and corner monuments, azimuth marks, etc. are also interchangeable with station marks, and indeed, any point whose position it is desired to fix at a given time may be designated as a "station mark."

Reference now will be made to the accompanying drawings which will illustrate the practice of the invention according to one embodiment thereof:

FIG. 1 is a schematic view of a helicopter hovering over a station mark undertaking survey work from the air.

FIG. 2 is a view in more detail of the instrumentation utilized in the survey method shown in FIG. 1; and FIG. 3 is a schematic electrical diagram of the control and actuating mechanism and associated instrumentation, utilized in the practice of this invention in conjunction with the equipment illustrated in FIG. 2.

FIG. 1 shows a hovering helicopter 10 (which may be a Bell 47 model 3B1 helicopter) hovering over a station mark 11, namely a point whose position it is desired to locate. The helicopter is provided with a height measuring device 12, which in the embodiment shown includes a plumb line 13 and a plumb bob 14. Alternatively, although not shown, the helicopter may be provided with a stadia rod incorporated in the bottom thereof which can be read through a telescope on the ground to obtain the measure of the vertical height of the helicopter above the station mark. The helicopter is provided with a laser detector 16 mounted on the left cargo rack. The detector 16 is adapted to receive the laser beam projected by a laser 25 situated over bench mark 11. Directly above the detector 16 is the lens of a television camera 17, the screen 19 of which is mounted adjacent the helicopter instrument panel 18. Directly above the television camera 17 is a sight light 20, which may be a Grimes beacon or a strobelite. This equipment is used to locate the point at station mark 11 in the horizontal plane.

As seen more clearly in FIG. 2, the altitude measuring device 12 includes a plumb bob 14 and reel 30, the reel being calibrated and spring loaded, and provided with a weight sensitive indicator. The spring release in the system records the instant that plumb bob 14 touches the terrain, thus giving the vertical height of the calibrated drum 30 above the station mark 11.

Over station mark 11 is a tripod 21, on the bench 22 of which is mounted a level 23, a vertical telescope 24, and a transit-laser 25. The laser detector 16 includes a dome 26 provided with two internal concentric rows of laser beam sensitive cells 27 and 28, which may be photovoltaic or photoresistance cells. The lens 29 of television camera 17 is in direct vertical line with the laser detector 16. The instrument panel is also provided with indicator lights 31 to be more fully described with reference to FIG. 3.

While not shown in FIG. 2, the rows 27 and 28 of laser beam sensitive cells may be coupled to the sight light and to the electronic distance measuring equipment, e.g. an autotape or position fixing device known as model MRB3 of Tellurometer Canada Limited. The measuring means could be activated when the detector 16 receives the beam of the laser 25; thus automatic distance readings may be taken on two remote units, one located at each of two known locations.

FIG. 3 schematically illustrates the electrical circuit diagram. A power supply 32 is operatively connected to the dome 26 of the laser detector, to an on/off switch 33 and thence to a distance measuring device 37, to the sight light 20, and to the sight light indicator light 34. The power supply is also connected to the motor of the calibrated drum 30, which is in turn connected to two indicator lights 35 and 36 on the instrument panel. The dome 26 of the laser receiver 16 is also connected to on/off switch 33.

In operation, the pilot positions himself utilizing the closed circuit television system. The viewing console with screen 19 is mounted adjacent the instrument panel for easy line-of-vision requiring a minimum of eye movement by the pilot from the RPM indicator. It is preferred that cross-hairs be placed on the console face to assist the pilot in positioning the helicopter 10 over the station mark 11. Two-way radio communication between the pilot and a man on the ground may also be used as an alternative positioning method.

As the helicopter manoeuvres over the survey point the dome 26 receives the laser beam from laser 25, and the beam will first fall on at least one of the outer row of detection cells 27. This will produce no change since the switch 33 will already be in the off position. When the laser beam is detected by one of the inner row of cells 28, indicating that the helicopter is positioned vertically above the beam of laser 25, switch 33 closes and sight light 20, indicator light 34, and distance measuring equipment 37 will be turned on. If the helicopter "drifts" off from the verical, one of the outer row of detection cells 27 will be triggered opening switch 33 and positively discontinuing operation of equipment 37 and lights 20 and 34. The turning on and off of switch 33 in response to signals generated by the detection cells can be used to initiate and terminate indicator lights, a sight light, and horizontal and vertical distance measuring equipment.

Indicator light 35 may be a green light and indicator light 36 a red light. They are controlled by a tension spring in the line 13, with the green light 35 being on until the plumb bob 14 touches the ground, at which time the green light 35 goes out and the red light 36 comes on. These two lights are in the pilot's line of sight, either on the helicopter instrument panel or on top of the television viewing console. These lights optionally could be eliminated or verified by the use of a two-way radio on the occasions where a man is stationed on the ground by the station mark.

We claim:

1. A control and actuating apparatus including a helicopter, a laser beam detector mounted on said helicopter, and detector controlled apparatus responsive to operation of said laser beam detector, said laser beam detector having a first laser beam sensitive cell in said detector for sensing a predetermined desired condition and in response thereto initiating operation of said detector controlled apparatus, and a second laser beam sensitive cell in said detector for sensing the existence of a predetermined undesired condition and in response thereto positively discontinuing operation of said apparatus.

2. A control and actuating apparatus as defined in claim 1, wherein said first laser beam sensitive cell is one of a plurality of first laser beam sensitive cells for sensing said predetermined desired condition, said second laser beam sensitive cell is one of a plurality of second laser beam sensitive cells for sensing said predetermined undesired condition, and said first and second laser beam sensitive cells are arranged in respective first and second concentric arrays.

3. A control and actuating apparatus as defined in claim 1, wherein said detector controlled apparatus comprises distance measuring equipment.

4. A control and actuating apparatus as defined in claim 2, wherein said detector controlled apparatus comprises distance measuring equipment.

5. A control and actuating apparatus as defined in claim 1, wherein said detector controlled apparatus comprises an altitude measuring device.

6. A control and actuating apparatus as defined in claim 2, wherein said detector controlled apparatus comprises an altitude measuring device.

7. A control and actuating apparatus as defined in claim 3, wherein said detector controlled apparatus comprises an altitude measuring device.

8. A control and actuating apparatus as defined in claim 4, wherein said detector controlled apparatus comprises an altitude measuring device.

* * * * *